United States Patent
Bell et al.

[11] Patent Number: 6,011,338
[45] Date of Patent: Jan. 4, 2000

[54] ELECTRIC MOTOR HAVING AUXILIARY WINDING ARRANGEMENT FOR ELECTROSTATIC SHIELDING

[75] Inventors: Sidney Bell; David M. Byrd, both of Athens, Ga.

[73] Assignee: Reliance Electric Industrial Company, Cleveland, Ohio

[21] Appl. No.: 09/113,490

[22] Filed: Jul. 10, 1998

[51] Int. Cl.[7] .............................. H02K 1/00; H02K 3/04
[52] U.S. Cl. ......................... 310/184; 310/198; 310/202
[58] Field of Search ................................. 310/184, 182, 310/183, 198, 210, 211, 85, 86, 104, 180, 179, 216, 196, 197, 72, 208, 202

[56] References Cited

U.S. PATENT DOCUMENTS

| | | |
|---|---|---|
| 2,573,126 | 10/1951 | Andrus . |
| 3,283,187 | 11/1966 | Schaefer . |
| 3,633,056 | 1/1972 | Hoffmeyer ............................... 310/180 |
| 3,633,057 | 1/1972 | Smith et al. ............................. 310/184 |
| 4,160,926 | 7/1979 | Cope et al. . |
| 4,246,505 | 1/1981 | Yasaka et al. . |
| 4,308,476 | 12/1981 | Schuler . |
| 4,780,635 | 10/1988 | Neumann ................................ 310/216 |
| 4,949,001 | 8/1990 | Campbell . |
| 5,175,396 | 12/1992 | Emery et al. . |
| 5,341,561 | 8/1994 | Schorm et al. . |
| 5,661,353 | 8/1997 | Erdman et al. . |
| 5,821,649 | 10/1998 | Langhorst . |
| 5,821,652 | 10/1998 | Hyypio ...................................... 310/83 |

FOREIGN PATENT DOCUMENTS

| | | |
|---|---|---|
| 61-185034 | 8/1986 | Japan . |
| 963880 | 7/1964 | United Kingdom . |

OTHER PUBLICATIONS

U.S. Application No. 90008345 Bell et al., filed Jan. 16, 1998.
U.S. Application No 90008043 Bell, filed Jan. 16, 1998.

*Primary Examiner*—Nestor Ramirez
*Assistant Examiner*—Dang Dinh Le
*Attorney, Agent, or Firm*—Craig N. Killen; John M. Miller; John J. Horn

[57] ABSTRACT

An electromechanical machine includes a stator fixed with respect to a housing structure and a rotor fixed with respect to a driven shaft. The stator includes a magnetically permeable core having a plurality of parallel winding slots containing driven windings. Coilheads are located at opposite axial ends of the magnetically permeable core where the windings turn to extend down a parallel winding slot. The motor is also equipped with an auxiliary winding arrangement to reduce capacitive coupling between the stator and rotor during operation. The auxiliary winding arrangement comprises grounded auxiliary windings located in the winding slots and the inside surface of the coilheads to interpose the driven windings and the rotor.

20 Claims, 6 Drawing Sheets

ELECTRIC MOTOR HAVING AUXILIARY WINDING ARRANGEMENT FOR ELECTROSTATIC SHIELDING

BACKGROUND OF THE INVENTION

The present invention relates generally to the art of electric motors and other electromechanical machines. More particularly, the invention relates to an electric motor including a novel structure to achieve electrostatic shielding.

The shaft of an AC induction motor or other electromechanical machine is often supported by bearing assemblies maintained in position by the machine housing. In one known construction, each bearing assembly is supported by a portion of the housing known as the "end bell." As its name implies, the end bell is located at one axial end of the housing, and defines a hole through which the rotatable shaft freely extends.

During operation of an electric motor, capacitive coupling can often occur between the stator and rotor. Occasionally, the potential difference developed in this manner will exceed a magnitude necessary to break down insulating grease in the bearing assembly. In this case, currents may arc or discharge from the bearing balls or rollers to the outer bearing race causing "pits" or other undesirable effects. As a result, more frequent servicing of the bearing assemblies may be required.

The prior art has provided electrostatic shield arrangements to reduce capacitive coupling between the rotor and stator, and consequent current discharge through the bearing assemblies. Examples of various shield configurations can be seen in U.S. Pat. No. 5,661,353 to Erdman et al., incorporated herein by reference. While these arrangements have been effective at reducing capacitive coupling, a further need exists for various novel electrostatic shield structures that may be advantageous in particular applications.

SUMMARY OF THE INVENTION

The present invention recognizes and addresses the foregoing disadvantages, and others of prior art constructions and methods. Accordingly, it is an object of the present invention to provide an electromechanical machine having a novel electrostatic shield structure.

It is a further object of the present invention to provide an electrostatic shield structure that provides controlled and effective shielding.

It is also an object of the present invention to provide an electrostatic shield structure that is compatible with a variety of motor configurations.

It is a further object of the present invention to provide an electrostatic shield structure that may be employed in a mass production environment.

It is a particular object of the present invention to provide an electrostatic shield structure that can be well insulated from driven windings of the electromechanical machine.

Some of these objects are achieved by an electromechanical machine comprising a housing structure that rotatably supports a shaft along a predetermined central axis. A stator, fixed with respect to the housing structure, has a plurality of driven windings radially spaced about the central axis. A rotor is located radially inward of the stator and fixed with respect to the shaft. The electromechanical machine further includes an auxiliary winding arrangement, located between the driven windings and the rotor, to provide electrostatic shielding. The auxiliary winding arrangement is preferably electrically connected to ground potential.

In some exemplary embodiments, the auxiliary winding arrangement comprises auxiliary windings connected to have at least one first open terminal and at least one second grounded terminal. For example, the auxiliary windings include at least one coil in each of a plurality of winding phases. One terminal of each such winding phase may be connected together at a common grounded node. In some embodiments, the winding phases may be connected together in a wye connection pattern. Alternatively, the winding phases may be connected together in a series connection pattern.

Other objects of the present invention are achieved by an electromechanical machine comprising a stator. The stator is constructed having driven windings located in a plurality of parallel, axially extending winding slots defined about an inner surface of a magnetically permeable core. The stator further comprises first and second coilheads located at opposite axial ends of the magnetically permeable core. In addition, a rotor is located radially inward of the stator. The electromechanical machine also further comprises an auxiliary winding arrangement located in the winding slots and an inside surface of the coilheads to interpose the driven windings and the rotor. Preferably, the auxiliary winding arrangement is in electrical communication with the magnetically permeable core and is grounded thereby.

In some exemplary embodiments, an insulative sheet element is located between the driven windings and auxiliary windings at each of the coilheads. In addition, each of the slots may contain an insulative slot liner having therein the driven and auxiliary windings. In such embodiments, the driven and auxiliary windings may be separated in the slot liner by an insulative divider member. An insulative topstick may also be located in each of the slots to enclose the driven and auxiliary windings.

Other objects, features and aspects of the present invention are achieved by various combinations and subcombinations of the disclosed elements, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
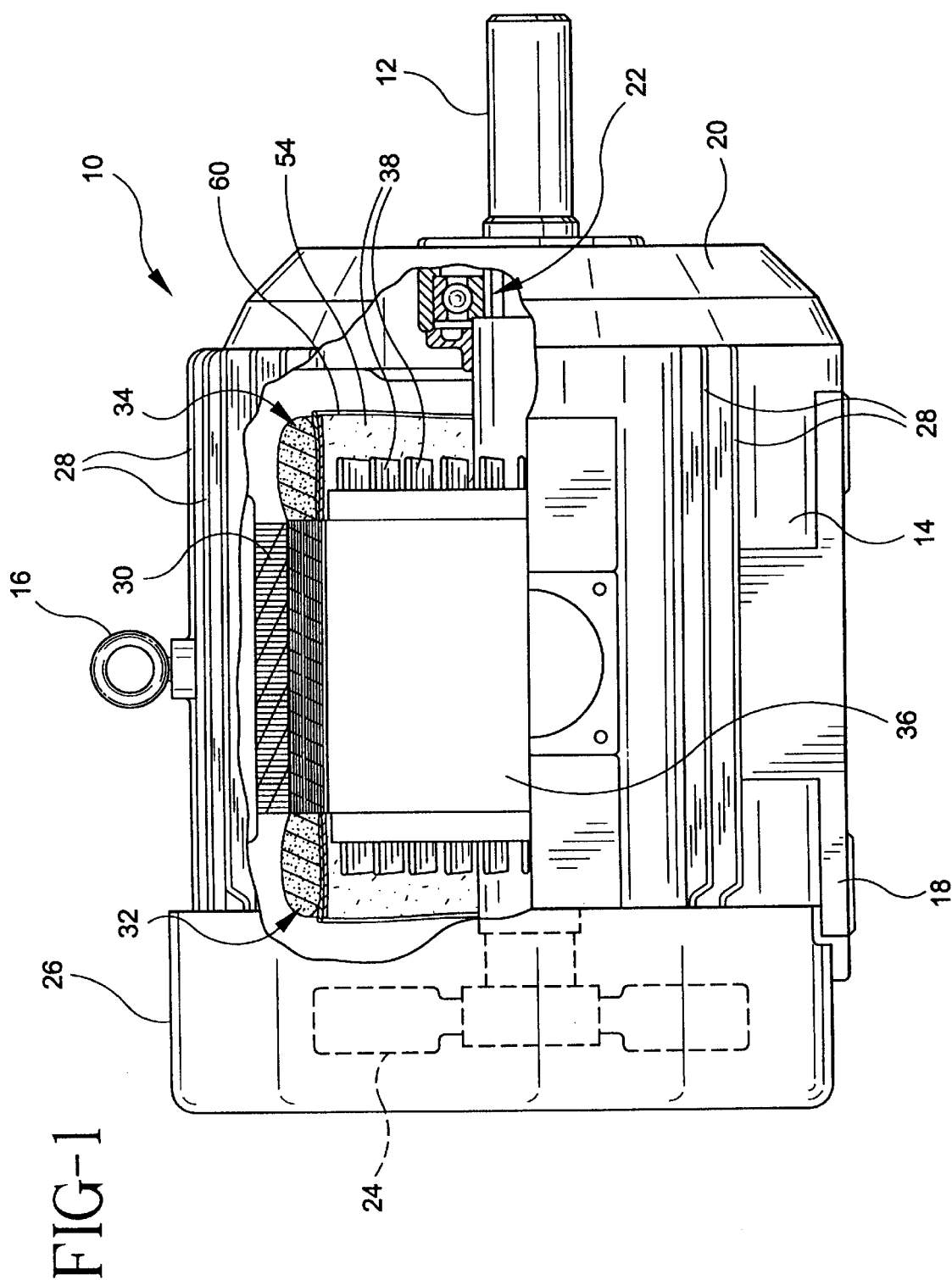
FIG. 1 is an elevational view of an electric motor showing the motor housing partially cut away to reveal various internal components therein.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Figure 2:
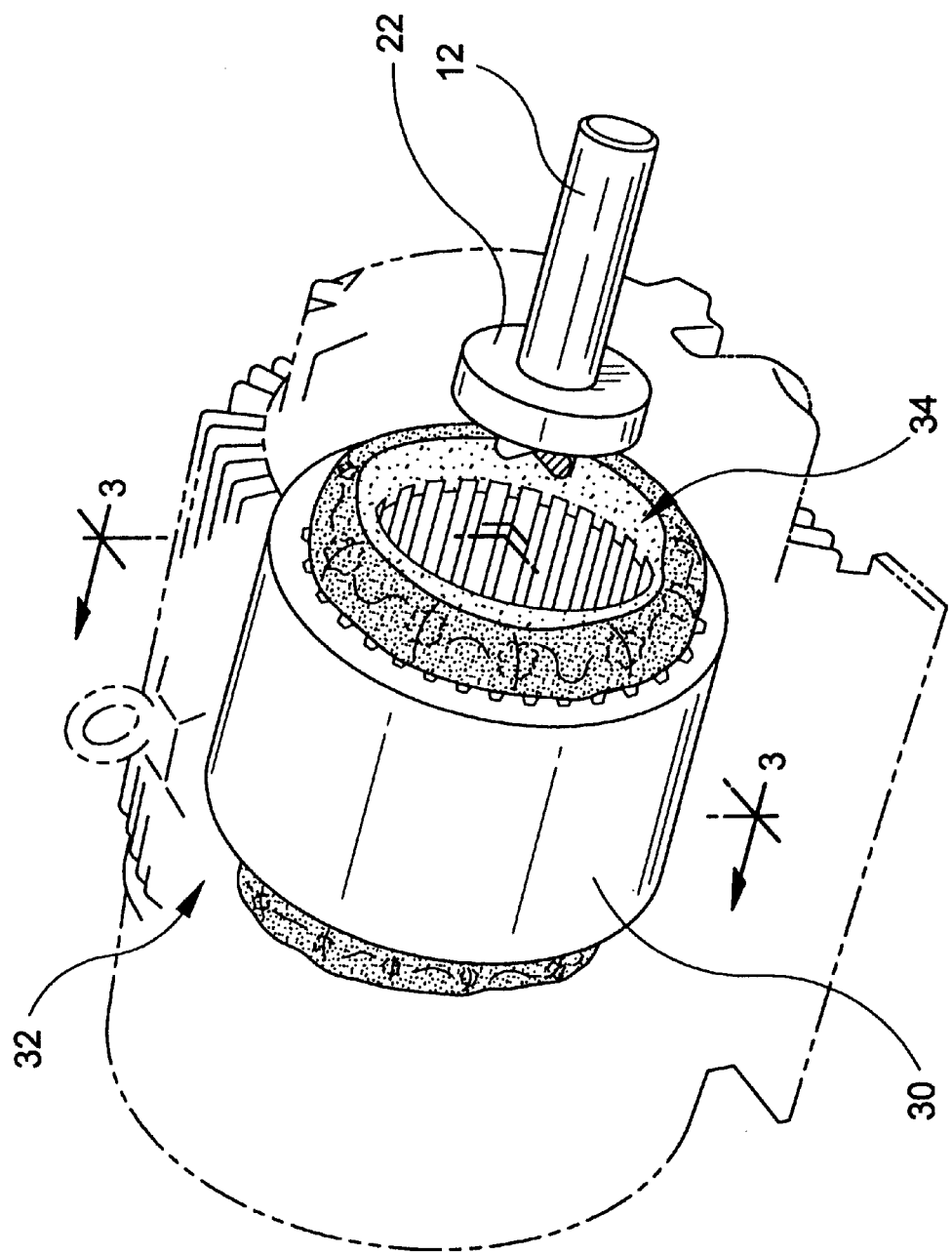
FIG. 2 is a perspective view of the stator and a portion of the motor shaft, with the motor housing being shown in phantom.

Referring now to FIGS. 1 and 2, an electric motor 10 constructed in accordance with the present invention has a rotatable shaft 12 extending along a central axis. The internal components of motor 10 are enclosed by a housing including a main housing portion 14. One or more eyebolts 16 may be provided to facilitate lifting of motor 10. Main housing portion 14 defines an appropriate base 18 on which motor 10 will rest during use.

The housing of motor 10 further includes end portions, such as end bell 20, located at respective axial sides of main housing portion 14. The end portions may be attached to main housing portion 14 by any appropriate means, such as by bolts. Typically, each end portion will maintain a respective bearing assembly, such as bearing assembly 22, to facilitate rotation of shaft 12.

Shaft 12 continues through bearing assembly 22 and beyond end bell 20 for connection to other equipment. The opposite end of shaft 12 may carry a fan 24, located within shroud 26. Due to the configuration of shroud 26, rotation of fan 24 causes cooling air to circulate around various cooling fins 28 defined on the exterior of main housing portion 14.

Inside of its housing, motor 10 includes a stator that remains fixed during operation. The stator has a magnetically permeable core 30 preferably comprising a plurality of relatively thin laminations arranged in a stack. Longitudinal driven windings are located in parallel, axially-extending slots defined about the inside surface of core 30 to provide a flow path for flux-generating current. The windings turn at respective coilheads 32 and 34 to return along a parallel slot.

A rotor 36, secured to shaft 12, desirably rotates based on the electromagnetic interaction between it and the stator. In the illustrated embodiment, motor 10 is an induction motor. Rotor 36 may be constructed as a squirrel cage, bar rotor or wound rotor in a known manner. A plurality of radial vanes, such as vanes 38, may be provided at the periphery of the rotor ends to circulate cooling air inside the motor housing.

During operation, capacitive coupling between the stator and rotor of an electric motor may produce errant currents through the bearing assemblies utilized to support the rotatable shaft. As described above, arcing in the bearing assembly can pit the race on which the ball or roller bearings ride, leading to increased maintenance requirements. To reduce capacitive coupling, motor 10 includes an auxiliary winding arrangement between rotor 36 and the driven windings of the stator. The auxiliary winding arrangement provides a conductive path to ground for charge that could otherwise collect on rotor 36. In addition, the auxiliary winding arrangement is well-insulated from the driven windings of the stator. This is particularly advantageous in some inverter-driven motor applications due to the high switching voltages that can be developed.

Figure 3:
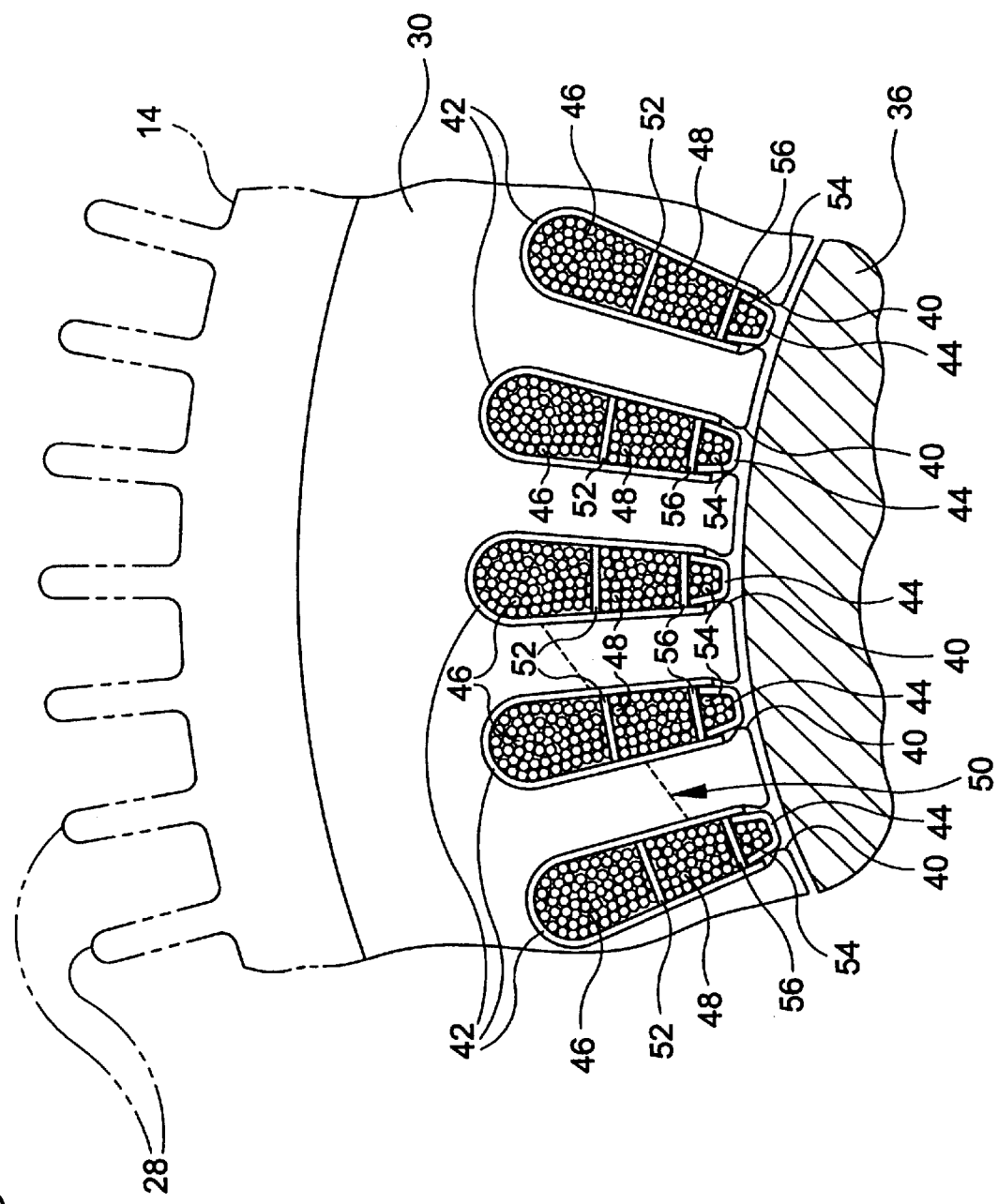
FIG. 3 is an enlarged partial cross-sectional view as taken along line 3—3 of FIG. 2.
Figure 4:
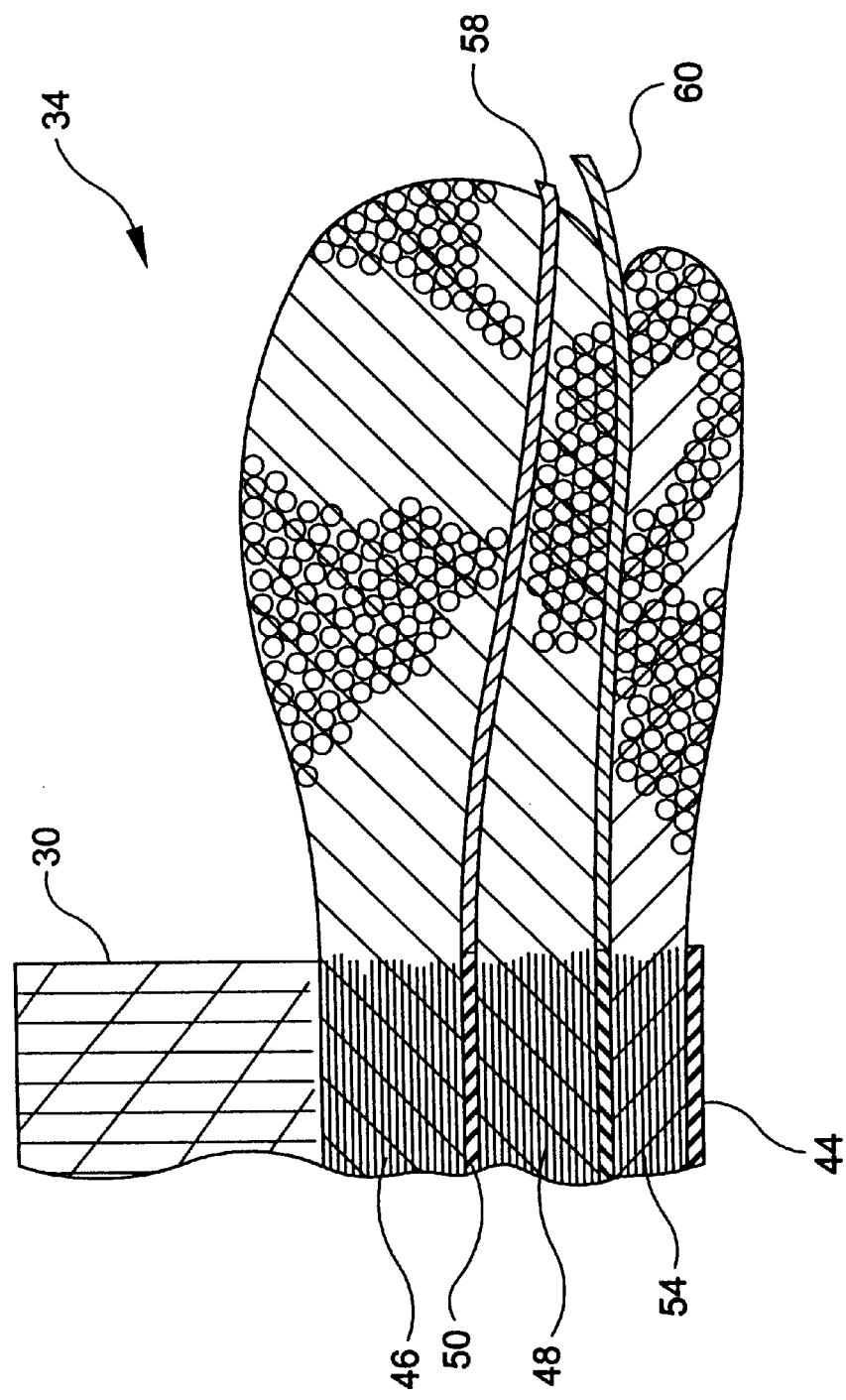
FIG. 4 is an enlarged partial cross-sectional view of a stator coilhead showing auxiliary windings used to achieve electrostatic shielding.

Referring now to FIGS. 3 and 4, the construction of the auxiliary winding arrangement can be most easily explained. In particular, FIG. 3 shows the auxiliary winding arrangement in the parallel winding slots 40. The construction of the auxiliary winding arrangement at the coilheads may be understood with reference to FIG. 4, where only coilhead 34 is shown for purposes of explanation.

As can be seen in FIG. 3, the driven windings each comprise a plurality of individual conductors situated in winding slots 40. Although the conductors are individually insulated, an insulative slot liner 42 is preferably located in each slot to further prevent the possibility of grounding to core 30. An insulative top liner 44, known as a "topstick," may be located at the "stop" of each slot as shown.

Although a slot may contain only one driven winding, multiphase motors in particular will often have two or more driven coil sides in each slot. In the illustrated embodiment, for example, each slot 40 contains a "lower" driven winding 46 and an "upper" driven winding 48. As known to those skilled in the art, the winding coils may be placed in the slots in an overlapping manner. Thus, as indicated at 50, a lower driven winding 46 in one slot and an upper driven winding 48 in a slot several positions away may comprise the respective sides of a single winding coil. The upper and lower driven windings may separated by a respective insulative divider member 52.

The stator further includes auxiliary windings 54 located at the "top" of each slot 42. The auxiliary windings may be inserted in the slots in an overlapping manner similar to that described above for the driven windings. The auxiliary windings are preferably connected together and grounded in a manner that inhibits capacitive coupling between the stator and the rotor of the electromechanical machine. Because core 30 is already grounded, there is generally no need to provide electrostatic shielding on the inner surface of core 30 between adjacent winding slots.

Preferably, the auxiliary windings will be well-insulated from the driven windings in order to prevent interference with normal operation of the motor. Thus, in the illustrated embodiment, auxiliary windings 54 are preferably separated from the driven windings of each slot 40 by a respective insulative divider member 56. Generally, the individual conductors of the auxiliary windings will be insulated with a coating of varnish or the like. Due to the relatively low voltages that will be present on the undriven auxiliary windings, it is not believed necessary to provide any further insulation between respective coils thereof.

Referring now to FIG. 4, the driven windings 46 and 48 turn at coilhead 34 to extend back along a parallel slot. Typically, the coilheads will include multiple phase insulators to further enhance the insulation between the phase windings in the coilhead region. For example, insulative sheet element 58 (often referred to as "phasepaper") may placed between lower winding 46 and upper winding 48.

An additional insulative sheet element 60 is placed between the inside surface of the coilhead and the auxiliary windings 54 to provide electrical isolation from the driven windings. It is not believed necessary, however, to provide additional insulation between the auxiliary windings themselves at the coilhead region. Preferably, auxiliary windings 54 will have an axial extent at least substantially the same as the driven windings, to facilitate effective electrostatic shielding.

Figure 5:
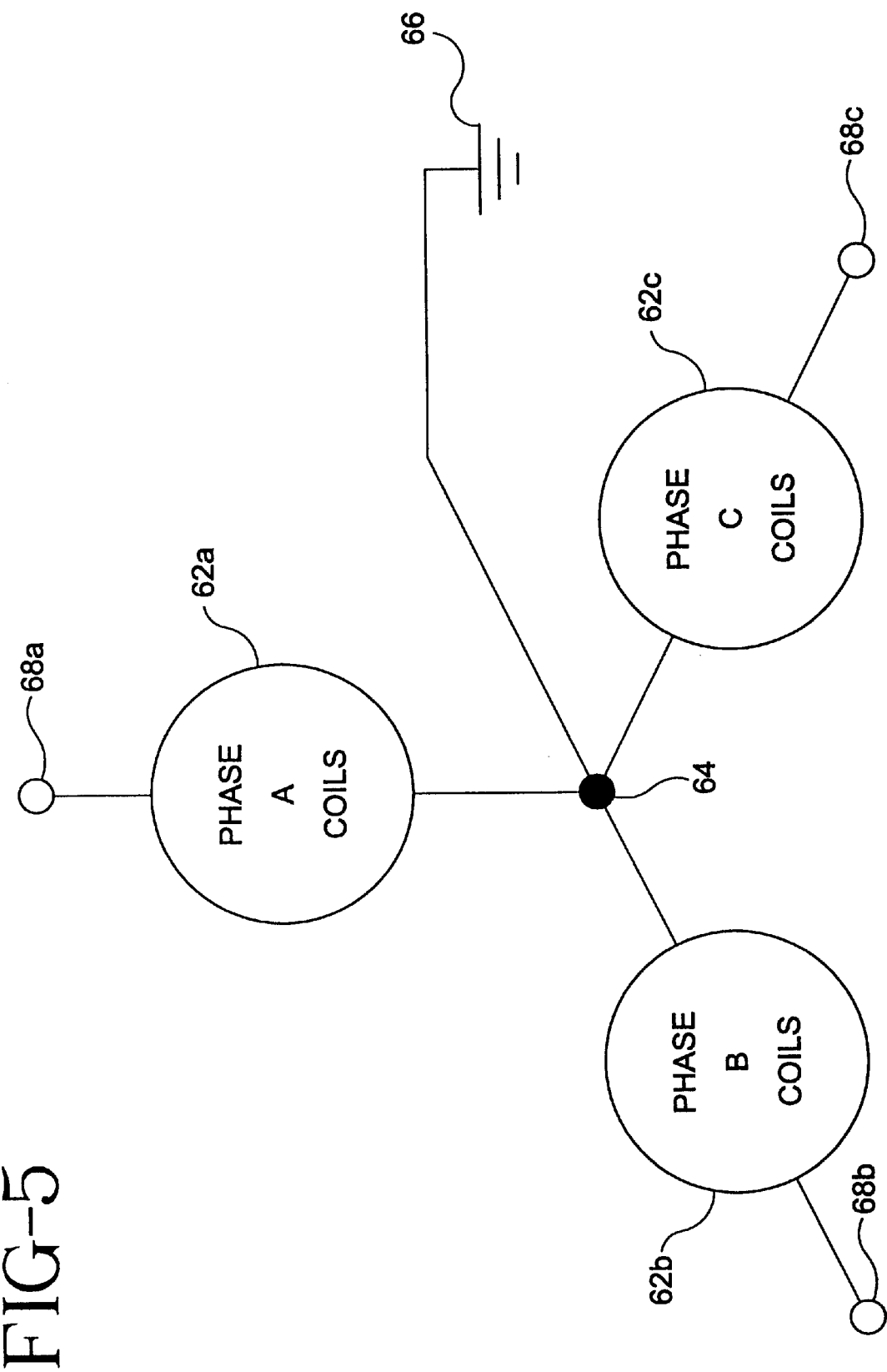
FIG. 5 is a schematic diagram of one manner in which coils of the auxiliary winding arrangement may be connected.

It will be appreciated that the auxiliary windings may be connected together in any suitable manner that achieves the desired function. For example, FIG. 5 shows one manner in which the windings of the auxiliary shielding arrangement can be connected together. In this case, the auxiliary windings are wound into three phases (designated A, B and C). As one skilled in the art will recognize, each phase may itself include a number of series-connected coils. For example, a three-phase "4-pole" arrangement may have four series-connected coils in each pole group, with four pole groups in each phase leg. In such an example, the auxiliary winding arrangement would have a total of forty-eight coils. The multiple coils of each phase leg are collectively indicated at 62a, 62b and 62c.

In this case, phase coils 62a, 62b and 62c are connected in a wye arrangement having a neutral node 64. Neutral node 64 is itself connected to ground, as indicated at 66. For example, neutral node 64 may be connected directly back to the magnetically permeable core of the stator. As a result, any charge accumulating on the respective phase coils will have a direct path to ground. This shielding structure can be easily activated or deactivated, if desired, by further providing a simple switch in the path to ground.

In order to prevent the auxiliary winding arrangement from producing induction effects, the opposite terminal (designated 68a–c) of the respective phase winding is simply left open. In other words, terminals 68a–c will be disconnected from any part of the motor that could create closed loops in the winding coils.

Figure 6:
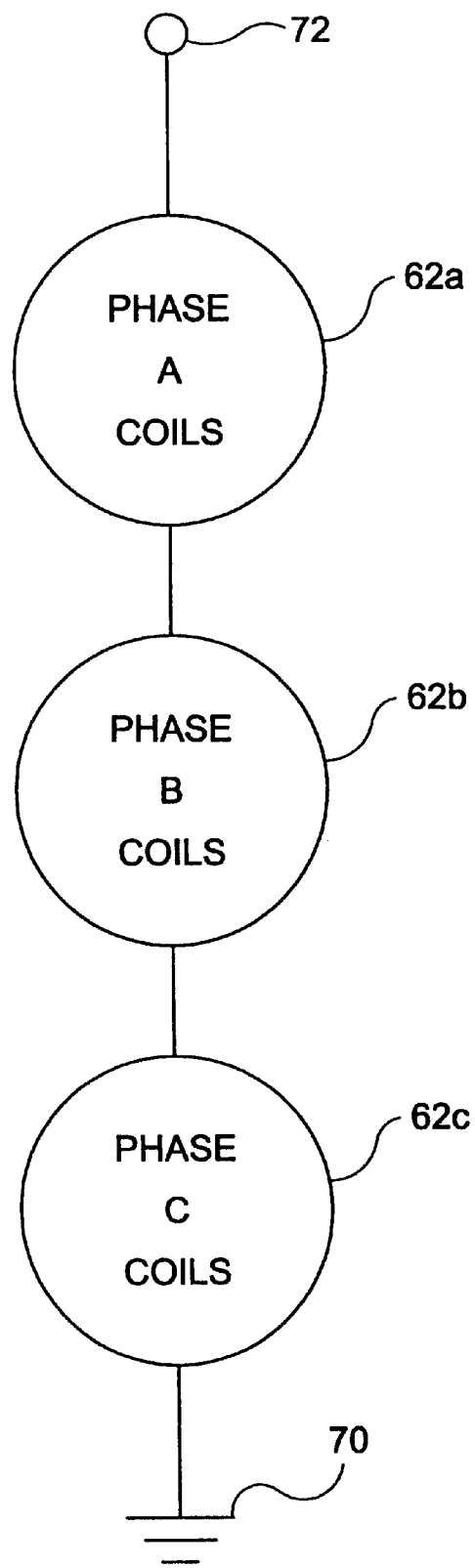
FIG. 6 is a schematic diagram of another manner in which coils of the auxiliary winding arrangement may be connected.

FIG. 6 illustrates an alternative manner in which phase windings 62a–c may be electrically connected. In this case, phase windings 62a–c are series-connected such that one terminal of the overall arrangement will be grounded, as indicated at 70. The opposite terminal 72 of the overall arrangement will be left open to inhibit induction, as described above.

It can thus be seen that the present invention provides electromechanical machines having a novel electrostatic shielding structure. While preferred embodiments of the invention have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. An electromechanical machine comprising:
    a housing structure;
    a shaft rotatably supported by said housing structure along a predetermined central axis;
    a stator fixed with respect to said housing structure, said stator having driven windings located in a plurality of parallel, axially extending winding slots defined about an inner surface of a magnetically permeable core;
    a rotor located radially inward of said stator and fixed with respect to said shaft; and
    an auxiliary winding arrangement located between said driven windings and said rotor to provide electrostatic shielding, said auxiliary winding arrangement having a plurality of elongate winding conductors wound into coils such that respective coil sides thereof are located in one of said winding slots.

2. An electromechanical machine as set forth in claim 1, wherein said auxiliary winding arrangement is electrically connected to ground potential.

3. An electromechanical machine as set forth in claim 2, wherein said auxiliary winding arrangement comprises auxiliary windings connected to have at least one open terminal and at least one grounded terminal.

4. An electromechanical machine as set forth in claim 3, wherein said auxiliary windings include at least one coil in each of a plurality of winding phases.

5. An electromechanical machine as set forth in claim 4, wherein one terminal of each of said winding phases is connected together at a common grounded node.

6. An electromechanical machine as set forth in claim 5, wherein said winding phases are connected together in a wye connection pattern.

7. An electromechanical machine as set forth in claim 5, wherein said plurality of winding phases comprises three winding phases.

8. An electromechanical machine as set forth in claim 4, wherein said winding phases are connected together in a series connection pattern.

9. An electromechanical machine comprising:
    a stator having driven windings located in a plurality of parallel, axially-extending winding slots defined about an inner surface of a magnetically permeable core, said stator further comprising first and second coilheads located at opposite axial ends of said magnetically permeable core;
    a rotor located radially inward of said stator; and
    an auxiliary winding arrangement located in said winding slots and an inside surface of said first and second coilheads to interpose said driven windings and said rotor, said auxiliary winding arrangement having a plurality of elongate winding conductors located in each of said winding slots, said elongate winding conductors being covered by an insulating material.

10. An electromechanical machine as set forth in claim 9, wherein said auxiliary winding arrangement is in electrical communication with said magnetically permeable core and is grounded thereby.

11. An electromechanical machine as set forth in claim 9, comprising an insulative sheet element between said driven windings and auxiliary windings of said auxiliary winding arrangement at each of said coilheads.

12. An electromechanical machine as set forth in claim 9, wherein each of said slots contains an insulative slot liner having therein said driven windings and auxiliary windings of said auxiliary winding arrangement.

13. An electromechanical machine as set forth in claim 12, wherein said driven windings and said auxiliary windings are separated in said slot liner by an insulative divider member.

14. An electromechanical machine as set forth in claim 12, further comprising an insulative topstick located in each of said slots to enclose said driven windings and said auxiliary windings.

15. An electromechanical machine as set forth in claim 9, wherein said auxiliary winding arrangement comprises auxiliary windings connected to have at least one open terminal and at least one grounded terminal.

16. An electromechanical machine as set forth in claim 15, wherein said auxiliary windings include at least one coil in each of a plurality of winding phases.

17. An electromechanical machine as set forth in claim 16, wherein one terminal of each of said winding phases is connected together at a common grounded node.

18. An electromechanical machine as set forth in claim 17, wherein said winding phases are connected together in a wye connection pattern.

19. An electromechanical machine as set forth in claim 18, wherein said plurality of winding phases comprises three winding phases.

20. An electromechanical machine as set forth in claim 16, wherein said winding phases are connected together in a series connection pattern.

* * * * *